(12) United States Patent
Gupta et al.

(10) Patent No.: US 10,158,543 B2
(45) Date of Patent: Dec. 18, 2018

(54) METHOD OF ESTIMATING ROUND-TRIP TIME (RTT) IN CONTENT-CENTRIC NETWORK (CCN)

(71) Applicant: SAMSUNG ELECTRONICS CO., LTD., Suwon-si (KR)

(72) Inventors: Abhishek Gupta, Bangalore (IN); Do Jun Byun, Seoul (KR); Myeong Wuk Jang, Hwaseong-si (KR); Rohit Gujrati, Bangalore (IN)

(73) Assignee: Samsung Electronics Co., Ltd (KR)

( * ) Notice: Subject to any disclaimer, the term of this patent is extended or adjusted under 35 U.S.C. 154(b) by 624 days.

(21) Appl. No.: 14/449,997

(22) Filed: Aug. 1, 2014

(65) Prior Publication Data

US 2015/0039754 A1 Feb. 5, 2015

(30) Foreign Application Priority Data

Aug. 1, 2013 (IN) ............................. 3466/CHE/2013
Dec. 18, 2013 (IN) ............................. 3466/CHE/2013
Mar. 18, 2014 (KR) ........................ 10-2014-0031545

(51) Int. Cl.
*H04L 12/24* (2006.01)
*H04L 12/26* (2006.01)

(52) U.S. Cl.
CPC ........ *H04L 43/0864* (2013.01); *H04L 41/147* (2013.01)

(58) Field of Classification Search
CPC .......................... H04L 41/147; H04L 43/0864
See application file for complete search history.

(56) References Cited

U.S. PATENT DOCUMENTS

| | | | |
|---|---|---|---|
| 2006/0018266 A1* | 1/2006 | Seo ........................ | H04L 1/0002 370/252 |
| 2006/0159098 A1* | 7/2006 | Munson .................. | H04L 47/10 370/394 |
| 2013/0182568 A1* | 7/2013 | Lee ........................ | H04L 47/127 370/231 |

* cited by examiner

*Primary Examiner* — Philip J Chea
*Assistant Examiner* — Mohammed Ahmed
(74) *Attorney, Agent, or Firm* — The Farrell Law Firm, P.C.

(57) ABSTRACT

A method of estimating a round-trip time (RTT) is provided. The method may include providing content requested by an interest packet with an identifier to identify a second node that sends the content to the first node, determining a processing time (PT) in which an interest packet is processed in the second node, based on an arrival time in which the content is received by the first node, evaluating an instantaneous RTT for the content received by the first node, based on an arrival time in which the content with the identifier is received at the first node, a sending time in which the interest packet is sent to the second node, or the determined PT, and estimating an RTT for the interest packet based on the evaluated instantaneous RTT.

27 Claims, 19 Drawing Sheets

| Proposed Mechanism | | | | Alternative Mechanism (DTO factor x = 0.5) | | | |
|---|---|---|---|---|---|---|---|
| Download Time (millisec) | | Interests | | Download Time (millisec) | | Interests | |
| run1 | run2 | run1 | run2 | run1 | run2 | run1 | run2 |
| 35272 | 35395 | 3283 | 3396 | 35234 | 35320 | 3481 | 3470 |

FIG. 15

| Proposed Mechanism | | | | Alternative Mechanism (DTO factor x = 0.5) | | | |
|---|---|---|---|---|---|---|---|
| Download Time (millisec) | | Interests | | Download Time (millisec) | | Interests | |
| run1 | run2 | run1 | run2 | run1 | run2 | run1 | run2 |
| 122616 | 126823 | 3962 | 4262 | 122022 | 124921 | 4158 | 4707 |

FIG. 16

METHOD OF ESTIMATING ROUND-TRIP TIME (RTT) IN CONTENT-CENTRIC NETWORK (CCN)

CROSS-REFERENCE TO RELATED APPLICATION(S)

This application claims the benefit under 35 USC 119(a) of Indian Patent Application No. 3466/CHE/2013, filed on Aug. 1, 2013 as Indian Provisional Application No. 3466/CHE/2013, and filed on Dec. 18, 2013 as Indian Patent Application No. 3466/CHE/2013, in the Office of the Controller General of Patents, Designs & Trade Marks (CGP-DTM), and Korean Patent Application No. 10-2014-0031545, filed on Mar. 18, 2014, in the Korean Intellectual Property Office, the entire disclosures of which are incorporated herein by reference for all purposes.

BACKGROUND

1. Field

The following description relates to a method of estimating a round-trip time (RTT) in a content-centric network (CCN).

2. Description of Related Art

Transmission control protocol (TCP)-based data packet networks are being used in computing environments. TCP is a fundamental protocol within an Internet architecture that manages transmission of data packets within a data network. In TCP-based data networks, a user or a consumer of content may merely receive the content by explicitly requesting the content from an Internet protocol (IP) address associated with a physical device or a location. However, the above restrictive addressing scheme may have inadequate performance for fast growing network demands.

Furthermore, in TCP-based data packet networks, a request may be sent by the consumer or the user of the content, to receive the content. The request may reach a content server in a network. The content server may send the requested content to the consumer. However, in such an approach, for every access of content, the network architecture may require that a new request is to be sent by the consumer to a server, to receive the requested content. As an alternative to existing TCP-based data packet networks, content-centric networking (CCN) or named data networking (NDN) has been developed. The CCN may be an alternative approach to providing an architecture for computer networks, and may provide a new networking principle for efficient information sharing using content names that may be used instead of a host addresses of an IP to identify content that is to be shared.

The CCN may allow a user to focus on data requested by the user, rather than having to provide a predetermined reference location, for example, a physical location from which content is received.

In the CCN, a requested packet may be referred to as an interest, and a reply packet may be referred to as a content object. Content may be divided into chunks, or content objects of appropriate sizes. Thus, each interest may request for a chunk. A node requesting content may sequentially send a number of interest packets. Each of the interest packets may be associated with a content object. In the CCN, for every interest, at most one content object may be received. Furthermore, an interest may be sent towards a content source by applying a suitable name-based routing technique. Each of the intermediate nodes of the CCN that receives an interest packet may check for a content object in a content cache of each of the intermediate nodes. Such a content cache is known as a content store (CS). When a requested content object is found in the CS, a node may respond with by providing the content object from the CS. When the requested content object is not found in the CS, the node may forward the interest packet to a next node of the CCN, for example, an adjacent node. Before forwarding the interest packet, each of the intermediate nodes may store interest packet information in an interest table of each of the intermediate nodes. Such an interest table is known as a propagating interest table (PIT). Forwarding of information may be performed manually or by using a suitable routing technique, and may be stored in a forwarding information base (FIB) table.

A node including a content object may reply to a requester by using a reversed path formed by using entries of a PIT created at intermediate nodes. When an interest is satisfied by content, or when content passes through the intermediate nodes, an entry of the PIT may be removed at the intermediate nodes including end nodes so that the PIT contains useful information about ways to provide content.

As described above, instead of using an inefficient scheme of sending only a single interest at a time, a plurality of requests may be aggregated to form an interest packet. Interest packet requestors may request a plurality of content objects that are monitored by dynamically changing an entity, known as a window size of an interest packet, instead of requesting a single content object.

Initially, an interest packet with a window size of "w_max" may be sent. When the interest packet is received, a content sender may verify the window size of the received interest packet, and may send content to a requesting node. Additionally, interest packet information may include a segment start range. A point of first missing content may be regarded as a point in which a new interest packet is to be constructed and sent to a next node in the CCN. Accordingly, the window size of the interest packet may be reduced at each node based on content availability at each node.

In TCP-based data networks, a round-trip time (RTT) may be estimated based on a time at which a request is sent, and a time at which content associated with the request arrives. The RTT may be estimated based on a difference between the time at which the request is sent and the time at which content associated with the request arrives. Such an RTT may be calculated by using timestamps to identify when these events occur.

In a CCN, an RTT may also be estimated based on a time at which an interest is sent, and a time at which a content object associated with the request arrives. Proper RTT estimation may be required to estimate various timer values, for example, a retransmission timeout (RTO), a delayed interest timeout (DTO), and a negative acknowledgement timeout (NTO). Such timer values may be used to regulate information transmission throughout the network.

In TCP-based data networks, content may be received from a single entity, for example, a content server. A TCP node may establish an end-to-end connection with a content server to obtain content. In such a scenario, RTT estimation of a TCP network may be inherently based on an assumption that content is received by a client from the same node, namely, a content server.

In the CCN, RTT estimation of a TCP may be used. For a single interest, at most one content object may be expected to be received. Additionally, when a single interest packet requests for a plurality of pieces of content, the RTT estimation of the TCP may require predetermined modifications to obtain relevant information for deriving such RTT estimation.

Therefore, a plurality of requestors may be grouped together to form an interest packet in a CCN. Thereafter, the interest packet may be sent to obtain content associated with the plurality of requestors. However, currently, a mechanism for measuring an RTT for the CCN when using such an interest packet does not exist.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of estimating a round-trip time (RTT) in a first node that sends an interest packet comprising requests for content includes providing the content with an identifier to identify a second node that sends the content to the first node, determining a processing time (PT) in which the interest packet is processed in the second node, based on an arrival time in which the content is received by the first node, evaluating an instantaneous RTT for the content received by the first node, based on the arrival time in which the content with the identifier is received at the first node, a sending time in which the interest packet is sent to the second node, or the determined PT, and estimating an RTT for the interest packet based on the evaluated instantaneous RTT.

The evaluating may be based on at least two of the arrival time in which the content with the identifier is received at the first node, the sending time in which the interest packet is sent to the second node, and the determined PT.

The method may further include identifying content associated with a first request among the requests in a content store (CS), prior to sending the interest packet, comprising a parameter, to the second node.

The method may further include receiving content associated with the first request.

The parameter may include a number of requests or a request start segment number.

The parameter may be altered based on availability of the content at the second node, and an interest packet with the altered parameter may be sent to an adjacent node of the second node.

The PT may be determined based on an arrival time in which the content with the identifier is received at the first node.

In response to the content being sent to the adjacent node, a value of the identifier provided to the content to send the content to the first node may be incremented.

The method may further include evaluating a retransmission timer, a delayed interest timer, or a negative acknowledgement (NACK) timer, based on the estimated RTT.

The delayed interest timer may be evaluated based on the determined PT and the estimated RTT, and may represent a time interval after an interest packet is sent to the second node, and the NACK timer may be evaluated based on the determined PT, and a value of the NACK timer may indicate a waiting time for sending a request to receive missing content at the first node.

In another general aspect, a method of controlling a first node to communicate with a second node includes sending an interest packet comprising a request to the second node, receiving content corresponding to the request from the second node, determining a processing time (PT) in which the second node processes the interest packet, based on an arrival time of the received content, and estimating a round-trip time (RTT) based on a sending time of the interest packet, the arrival time, or the determined PT.

The estimating may be based on at least two of the sending time of the interest packet, the arrival time, or the determined PT.

The interest packet may include requests, and the method may further include prior to sending the interest packet to the second node, identifying content associated with a first request among the requests in a content store (CS).

The method may further include receiving content associated with the first request.

The interest packet may include a parameter, and the parameter may include a number of the request or a request start segment number.

The parameter may be altered based on availability of the content at the second node.

The interest packet with the altered parameter may be sent to an adjacent node of the second node, and a value of an identifier provided to the content may be incremented.

The method may further include determining a retransmission timer, a delayed interest timer, or a negative acknowledgement (NACK) timer, based on the estimated RTT.

The delayed interest timer may be evaluated based on the determined PT and the estimated RTT, and represents a time interval after the interest packet is sent to the second node, and the NACK timer may be evaluated based on the determined PT, and a value of the NACK timer may indicate a waiting time for sending a request to receive missing content at the first node.

The estimating may include evaluating an instantaneous RTT based on the sending time, the arrival time, or the determined PT, and estimating the RTT based on the instantaneous RTT.

The estimating of the RTT based on the instantaneous RTT may include estimating the RTT using the instantaneous RTT and a transmission control protocol (TCP)-like RTT estimation method.

Pieces of content may be received, and the evaluating may include evaluating an instantaneous RTT for each of the pieces of content based on at least one of an arrival time of each of the plurality of pieces of content, the sending time, and the determined PT.

In another general aspect, a method of estimating a round-trip time (RTT) in a first node that sends an interest packet comprising requests for content includes determining a processing time (PT) in which the interest packet is processed in a second node that sends the content, identified by an identifier, to the first node, based on an arrival time in which the content is received by the first node, and estimating an RTT for the interest packet based on an evaluated instantaneous RTT for the interest packet received by the first node, based on the arrival time in which the content with the identifier is received at the first node, a sending time in which the interest packet is sent to the second node, or the determined PT.

The evaluating may be based on at least two of the arrival time in which the content with the identifier is received at the first node, the sending time in which the interest packet is sent to the second node, and the determined PT.

The method may further include identifying content associated with a first request among the requests in a content store (CS), prior to sending the interest packet, comprising a parameter, to the second node.

The parameter may include a number of requests or a request start segment number.

The parameter may be altered based on availability of the content at the second node, and an interest packet with the altered parameter may be sent to an adjacent node of the second node.

The method may further include: evaluating a retransmission timer, a delayed interest timer, or a negative acknowledgement (NACK) timer, based on the estimated RTT.

Other features and aspects will be apparent from the following detailed description, the drawings, and the claims.

BRIEF DESCRIPTION OF THE DRAWINGS

FIG. 15 is a table illustrating an example of comparison results between a proposed mechanism and an alternative mechanism for four PC setups.

FIG. 16 is a table illustrating an example of results between a proposed mechanism and an alternative mechanism for two mobile setups.

Figure 1:
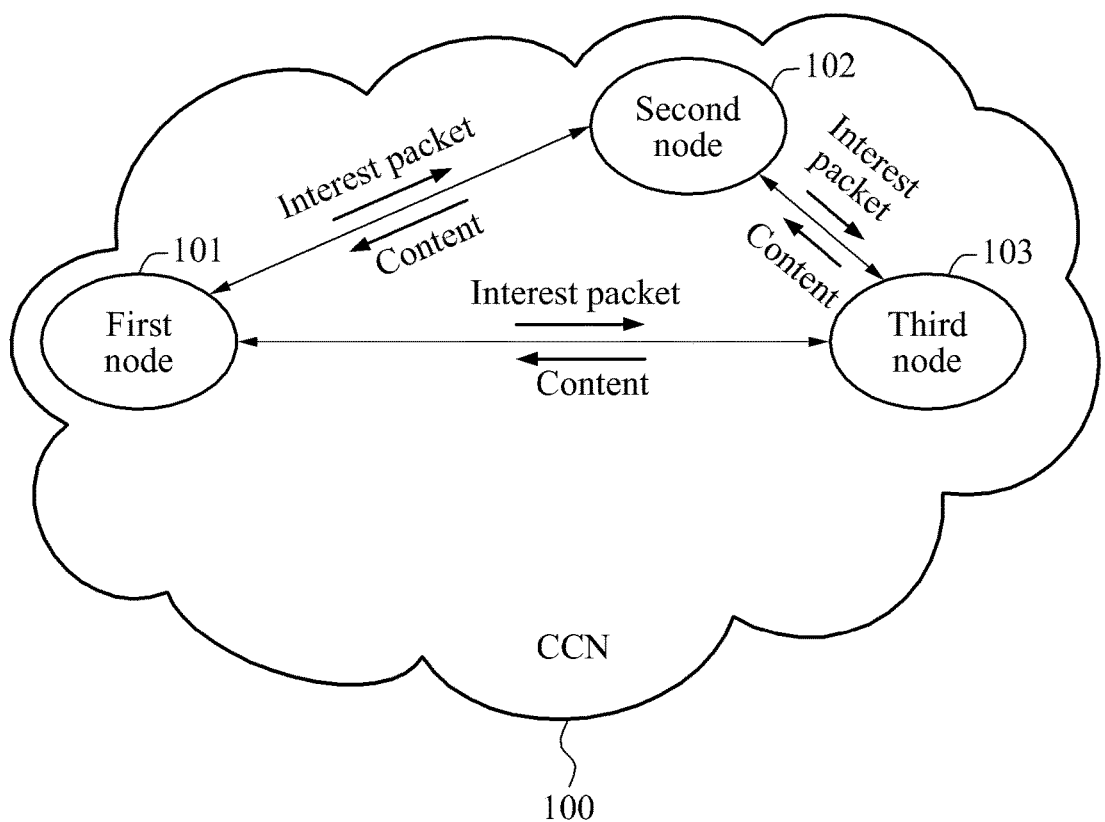
FIG. 1 is a diagram illustrating an example architecture of a content-centric network (CCN).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. These terms do not necessarily imply a specific order or arrangement of the elements, components, regions, layers and/or sections. Thus, a first element, component, region, layer or section discussed below could be termed a second element, component, region, layer or section without departing from the teachings description of the present examples.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present examples. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When the term "one or more" is used with respect to an element, it indicates that a single instance of the element or multiple instances of the element are present in various examples.

Unless otherwise defined, all terms (including technical and scientific terms) used herein have the same meaning as commonly understood by one of ordinary skill in the art to which the present examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various examples, a method and system for estimating a round-trip time (RTT) when at least one request is transmitted to acquire at least one content in a content-centric network (CCN) are provided. A plurality of requests in an interest packet are sent by a first node to at least one second node in the CCN. For example, the first node and the at least one second node are electronic devices, such as desktop computers, laptop computers, mobile phones, or other devices in a network.

In an example, the first node sends an interest packet to the at least one second node. In such an example, the first node sends an interest packet to a content store (CS), or a local CS. The at least one second node in the CCN, in such an example, include content associated with a plurality of requests included in the interest packet.

For example, an application located on the first node is configured to send an interest packet with at least one request through a browser to the at least one second node, to obtain content corresponding to the request.

In examples, the interest packet includes parameters. Example parameters include a number of requests and an interest start segment number.

The interest packet is sent to the at least one second node, in order to obtain content associated with the interest packet. In response to the interest packet being received from the first node, the at least one second node processes the interest packet to obtain the content associated with the requests in the interest packet. In an example, when at least one requested content associated with the requests in the interest packet is not available at the at least one second node, additional steps are taken to try to provide the content. For example, the interest packet is altered or modified, and is forwarded to an adjacent second node in the CCN. Thus, even if a given second node is unable to provide requested content itself, it performs operations to propagate requests throughout the CCN so that other nodes in the CCN are able to provide the requested content.

When the interest packet is altered before being forwarded, in an example the interest packet is altered by varying the parameters at each of the at least one second node, and the altered interest packet is forwarded to the adjacent second node in the CCN. The interest packet may be propagated through the CCN, and may be altered in all or a subset of the at least one second node based on availability of the content associated with the requests at each of the at least one adjacent second node of the CCN.

In this example, each of the at least one adjacent second node, in response to receiving the interest packet, identifies the content associated with the requests in the interest packet, processes each of the requests in the interest packet, and sends the content to the first node. The at least one second node sends the identified content to an adjacent second node in the CCN. The adjacent second node copies the received content from the at least one second node to a CS of the adjacent second node, and forwards the content to the first node. Thus, such an approach allows the nodes in the CCN to successfully provide requested content based on identifying the content, in cases where the content is available at some node in the CCN.

In an example, an RTT value is based on information such as an instantaneous RTT value for each content, an arrival time of each content, a sending time of each of the requests to the at least one second node, and a processing time (PT) of each content at each of the at least one second node. However, in other examples, other information is also used to aid in calculating an RTT value. For example, an identifier is provided for each content in the at least one second node to determine a second node from which content is received. A value of the identifier is incremented by "1" when content is sent by each of the at least one second node to the first node.

Additionally, based on the estimated RTT, values of various timers for time intervals related to the transmission are computed. For example, a retransmission timer, a delayed interest timer, and a negative acknowledgement (NACK) timer are computed.

By using various examples of an RTT estimation method as discussed further below, network conditions are effectively predicted. Such effective predictions allow accurate estimates of network performance, which can be used to improve network performance or anticipate conditions so as to take network performance into account when making decisions about how to utilize such a network.

FIG. 1 illustrates an example architecture of a CCN.

As illustrated in the example of FIG. 1, a CCN 100 includes a first node 101, a second node 102, and a third node 103. In the example of FIG. 1, the first node 101 sends an interest packet with at least one request to each of the second node 102 and the third node 103. In such an example, the interest packet includes parameters that include a number of requests and a request start segment number. However, it is easily understood that the parameters of the interest packet are not limited, and that additional parameters are used instead of or in addition to these parameters in other examples.

In response to the interest packet from the first node 101, in the example of FIG. 1, the second node 102 and the third node 103 send content associated with the at least one request in the interest packet to the first node 101. For example, such content is sent based on availability of the content at the second node 102 and the third node 103.

In an example, the interest packet is received at a local CS of the first node 101 that has a hop count of "0." When the content associated with the at least one request in the interest packet is identified by the local CS, the local CS sends the content to the first node 101.

In an additional example, based on availability of content at a predetermined second node, the interest packet is sent to an adjacent second node in the CCN as an alternative approach for obtaining the content. Before being sent, in such an example, the interest packet is altered or modified, and the altered or modified interest packet is sent to the adjacent second node. For example, the parameters in the interest packet are altered or modified based on availability of the content associated with the at least one request in the interest packet.

Figure 2:
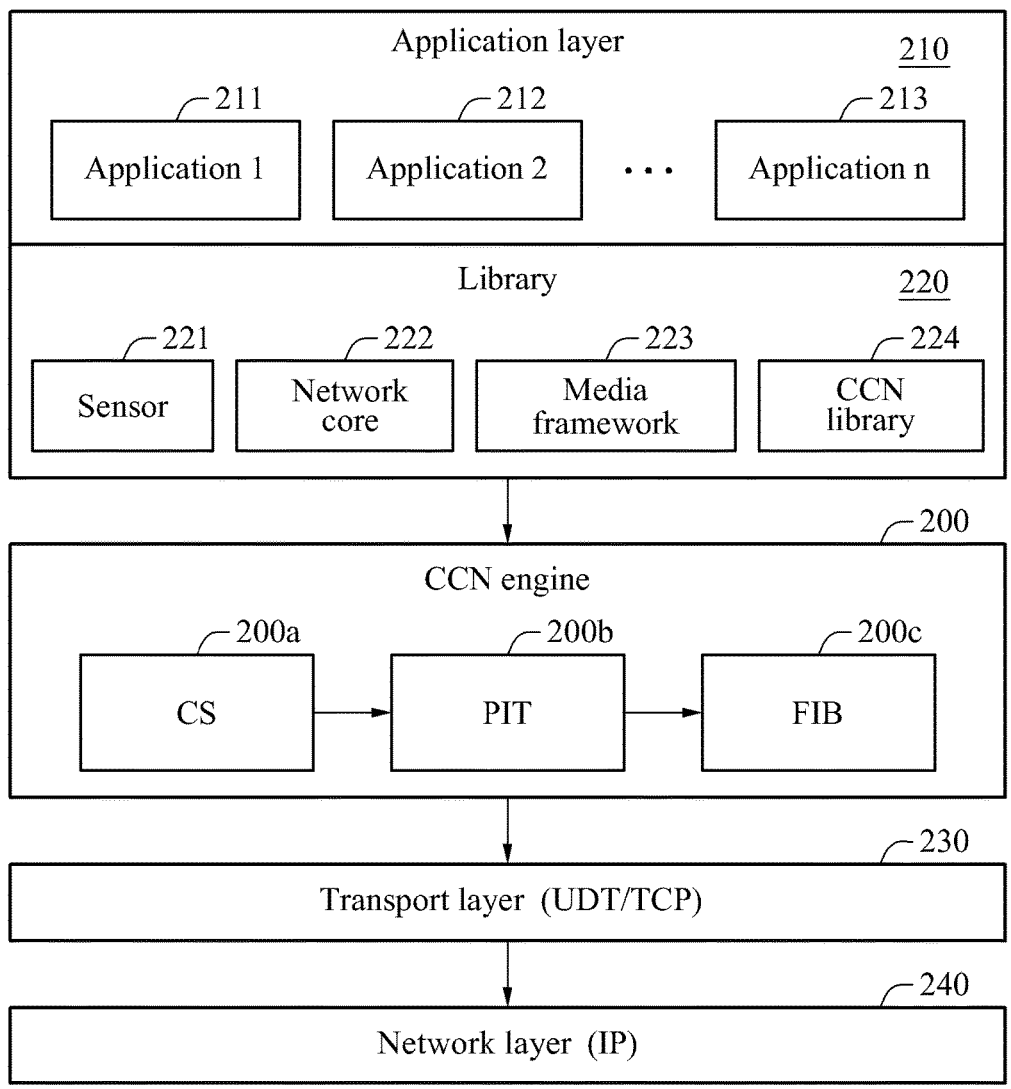
FIG. 2 is a block diagram illustrating an example of a node in a CCN.

FIG. 2 illustrates an example of a node in a CCN.

As illustrated in the example of FIG. 2, a node in a CCN, such as for example the first node 101, the second node 102, or the third node 103 of FIG. 1, includes an application layer 210. In the example of FIG. 2, the application layer 210 includes at least one application, for example, an application 1 211 to an application N 213. Thus, the application layer includes N applications as illustrated in FIG. 2. In such an example, an example of such an application is a browser installed on the first node 101.

Additionally, the node includes a library 220. The library 220 includes elements such as a sensor 221, a network core 222, a media framework 223, and a CCN library 224. However, the library 220 is not limited to these elements, and the library 220 optionally includes other appropriate elements in addition to or instead of these elements.

For example, an RTT estimation method and evaluation of corresponding timers is performed using elements included in the CCN library 224.

The node also includes a CCN engine 200. The CCN engine 200 includes a CS 200a, a propagation interest table (PIT) 200b, and a forwarding information block (FIB) 200c. A node seeking content, for example, the first node 101, in the example of FIG. 2 sends an interest packet with at least one request. Here, each of the at least one request corresponds to a content object. The sent interest packet is propagated towards a content source by applying a suitable name-based routing technique. Such name-based routing takes advantage of the ability of a CCN to employ such a routing technique.

Each of the intermediate nodes that receive the interest packet determines whether a requested content object exists in a content cache of each of the intermediate nodes. The content cache for the intermediate nodes, as discussed, is referred to as a CS. In an example, when a requested content object is found in the CS 200a, the node responds with the content object. In another example, when the requested content object is not found in the CS 200a, the node forwards the interest packet to a next node. Before the forwarding, the node also stores interest packet information in an interest table of the node, that is, the PIT 200b. To share the information, such information is forwarded either manually or through a suitable automated routing technique, and is stored in the FIB 200c.

In addition, in the example of FIG. 2, the CCN engine 200 sends the interest packet to a network layer 240 through a transport layer 230, as illustrated in FIG. 2.

Figure 3:
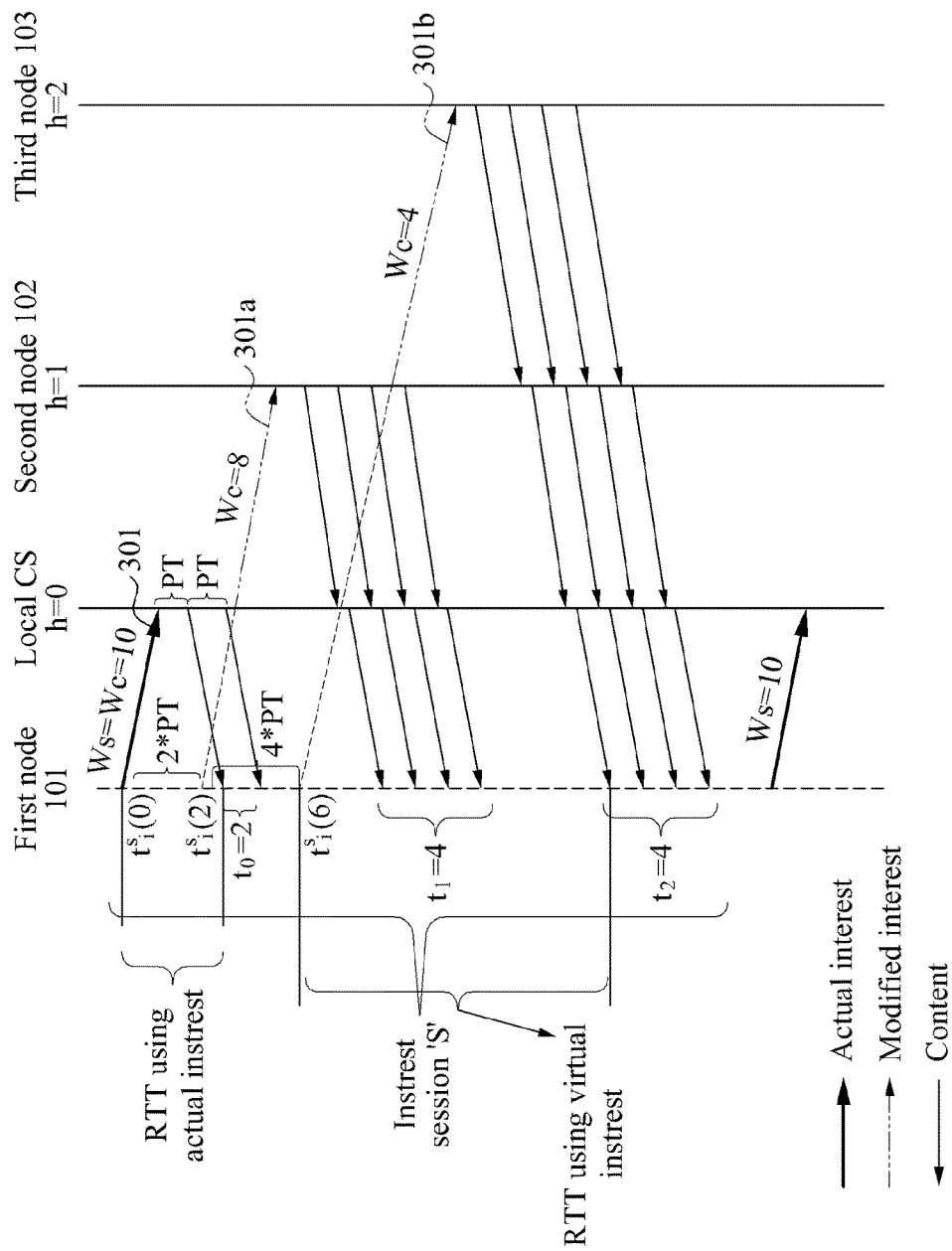
FIG. 3 is a diagram illustrating an example of a round-trip time (RTT) estimation method performed when at least one request in an interest packet is sent to at least one node.

FIG. 3 illustrates an example of an RTT estimation method performed when at least one request in an interest packet is sent to at least one node.

FIG. 3 illustrates a first node 101, a second node 102, and a third node 103. In the example of FIG. 3, the example assumes that ten requests are sent. However, in other examples, a number associated with the at least one request to be sent is less than or greater than "10." A content packet associated with a request is accompanied by an identifier that indicates a node sending content. Such an identifier is referred to as a hop count, such as H, for example, H=0, H=1, and H=2. In an example, the above identifier or a hop count field indicates a number of hops that are required for a content object to reach the first node 101. For example, when an intermediate node receiving content has a hop count of H, the intermediate node stores the content in a CS by modifying a hop field of the content so that it is set to zero. The intermediate node verifies in a PIT, based on the received content, to determine which content needs to be forwarded. Before forwarding, the intermediate node increments a value of a hop count field to a value of (H+1). For example, when content is received, a requestor node, that is, the first node 101 is able to determine which node sends the content by interpreting the value of the hop count H.

In the example of FIG. 3, to obtain content associated with the at least one request, the first node 101 sends an interest packet 301, that is, an actual interest with a request size $W_c$ of "10" at a time $t^s_i(0)$ to a local CS with an initial hop count of "0."

An application in the first node 101 sends the interest packet 301 to the local CS, such as through a browser.

In the example of FIG. 3, the local CS receives the interest packet 301 from the first node 101. Additionally, the local CS processes the interest packet 301 to identify the available content associated with the at least one request. When the content associated with the at least one request, for example, content 0 associated with request 0 and content 1 associated with request 1 is identified, the local CS sends the identified content to the first node 101. Thus, the local CS send content associated with the requests 0 and 1, in response to an actual interest packet received from the first node 101.

The content 0 and 1 are received at the first node 101 after a PT at the local CS. Similarly, each content associated with each request in an interest packet is received at the first node 101 after a PT at each of the second node 102 and the third node 103 in which the content is available.

As illustrated in the example of FIG. 3, the content 0 is received from the first node 101 at a time $t^s_0(0)$. In such an example, the first node 101 is a local CS with a hop count set to zero. Thus, an instantaneous RTT value for the content 0 is calculated based on a difference between the time $t^s_i(0)$ and the time $t^s_0(0)$ at which the content 0 arrives. Therefore, an RTT for the content 0 is calculated as shown in Equation 1 below.

$$RTT(0)=t_0^s(0)-t_i^s(0) \qquad \text{Equation 1}$$

Similarly, the content 1 is also received from the first node 101 in a manner in which the hop count of "0" remains unchanged. For arrival of the content 1 at a time $t^s_0(1)$, it is approximated that a corresponding interest is virtually sent at a time $t^s_i(1)$ represented by $t^s_i(1)=t^s_i(0)+PT$. Therefore, an instantaneous RTT value for the second content arrival of content 1 is denoted as RTT(1), and is calculated as shown in Equation 2 below.

$$RTT(1)=t_0^s(1)-t_i^s(1)=t_0^s(1)-t_i^s(0)-PT \qquad \text{Equation 2}$$

For example, when the content associated with the at least one request is sent, the local CS alters or modifies the interest packet, and sends the altered or modified interest packet to the second node 102 adjacent to the first node 101. Here, the second node 102 has a hop count of "1."

In an example, the local CS alters a number of requests in an interest packet, and provides a start segment number to the altered interest packet. Referring to FIG. 3, the altered interest packet 301 includes a window size of "8" and a start segment number of "2." The alteration is appropriate because two of the contents have already been provided. Here, the window size corresponds to a number of requests in the interest packet 301a.

In the example, of FIG. 3, when the altered interest packet 301a is received, the second node 102 processes the altered interest packet 301a, and identifies content associated with requests in the altered interest packet 301a.

Thus, when the content associated with the requests in the altered interest packet 301a is identified, the second node 102 sends the identified content to the first node 101.

The second node 102 sends content associated with each request to the CCN engine 200 of the first node 101, to which the local CS belongs, after a PT. In response to the content being received from the second node 102, the local CS stores the received content for each request. Additionally, in the example of FIG. 3, the CCN engine 200 of the first node 101 sends the received content to the first node 101.

As illustrated in FIG. 3, the second node 102 identifies content associated with requests 2 to 5, and sends the content to the CCN engine 200 of the first node 101. The CCN engine 200 of the first node 101 sends the received content to the first node 101. The content is forwarded from the second node 102 to the first node 101 after the PT at the second node 102.

For example, when an arrival time of content associated with the request 2 is denoted as $t^s_1(2)$, it is the case that the content is received from a different hop. Here, the content is received from the second node 102, as compared to previous content. For the content associated with the request 2, a virtual interest is sent approximately at a time $t^s_i(2)$ calculated as shown in Equation 3 below.

$$t^s_i(2) = t^s_i(1) + PT - t^s_0(1) - t^s_i(0) + 2*PT \quad \text{Equation 3}$$

Additionally, a corresponding instantaneous RTT value is calculated as shown in Equation 4 below.

$$RTT(2) = t^s_0(2) - t^s_i(2) = t^s_0(1) - t^s_i(0) - 2*PT \quad \text{Equation 4}$$

In addition, the altered interest packet 301a is again altered at the second node 102, and an altered interest packet 301b is forwarded to the third node 103. With respect to the alteration, the interest packet 301b is modified or altered to have a window size of "4" and a start segment number of "6." As discussed above, the alterations allow the packet to reflect that some of the content was already accessible. In this example, the window size of the interest packet 301b corresponds to a number of requests in the interest packet 301b.

In the example of FIG. 3, the third node 103 receives the altered interest packet 301b, and determines the number of the requests in the altered interest packet 301b. Additionally, the third node 103 processes the altered interest packet 301b, to identify content associated with requests 6 to 9. The third node 103 processes each request for a PT, and subsequently sends the identified content to the second node 102. Then, the second node 102 stores the received content, and forwards the received content to the CCN engine 200 of the first node 101.

The CCN engine 200 of the first node 101 copies the received content in the CS 200a of the CCN engine 200, and sends the content to the first node 101. Thus, instantaneous RTT values for each content arrival in the example of FIG. 3 are given in Table 1 below.

TABLE 1

| Content No. | Arrival time | Instantaneous RTT |
| --- | --- | --- |
| 0 | $t^s_0(0)$ | $t^s_0(0) - t^s_i(0) - 0*PT$ |
| 1 | $t^s_0(1)$ | $t^s_0(1) - t^s_i(0) - 1*PT$ |
| 2 | $t^s_1(2)$ | $t^s_1(2) - t^s_i(0) - 2*PT$ |
| 3 | $t^s_1(3)$ | $t^s_1(3) - t^s_i(0) - 3*PT$ |
| 4 | $t^s_1(4)$ | $t^s_1(4) - t^s_i(0) - 4*PT$ |
| 5 | $t^s_1(5)$ | $t^s_1(5) - t^s_i(0) - 5*PT$ |
| 6 | $t^s_2(6)$ | $t^s_2(6) - t^s_i(0) - 6*PT$ |
| 7 | $t^s_2(7)$ | $t^s_2(7) - t^s_i(0) - 7*PT$ |
| 8 | $t^s_2(8)$ | $t^s_2(8) - t^s_i(0) - 8*PT$ |
| 9 | $t^s_2(9)$ | $t^s_2(9) - t^s_i(0) - 9*PT$ |

Each of the instantaneous RTT values is used to estimate the RTT using the TCP-like RTT estimation method. Thus, RTT estimation for an interest packet in an interest session is calculated as shown in Equation 5 below.

$$RTT_e(t_k) = (1-\alpha)*RTT_e(t_{(k-1)}) + \alpha*RTT^s_h(k_j) \quad \text{Equation 5}$$

In Equation 5, $RTT^s_h(k_j)$ may be calculated as shown in Equation 6 below.

$$RTT^s_h(k_j) = (t_h(k_j) - t^s(0)) - \left( \sum_{i=0}^{i=h-1} \omega_i * PT + (j_h - 1) * PT \right) \quad \text{Equation 6}$$

In Equations 5 and 6, $RTT_e(t_k)$ and $RTT_e(t_{(k-1)})$ indicates an RTT estimated at a time $t_k$, and an RTT estimated at a time $t_{(k-1)}$, respectively. Additionally, $RTT^s_h(k_j)$ indicates a current RTT estimated for content $j_h-1$ received in an interest session s from a $h^{th}$ hop at the time $t_k$. Additionally, $\alpha$ and $\omega_i$ indicate parameters that are experimentally decided to provide optimal performance and accuracy, and PT denotes a content processing time.

While computing the instantaneous RTT values, the PT is assumed to be constant. In some actual scenarios, a PT is not actually constant and accordingly, estimation of the PT in such scenarios is described below.

Receiving consecutive content from the same node, that is, a hop, potentially indicates that a time difference between arrivals of two pieces of content provides an instantaneous value of a PT. For example, when the consecutive content is received from different nodes, that is, hops, the time difference is potentially not equal to the PT. Thus, instantaneous RTT values are given as shown in Table 2 below.

TABLE 2

| Content pairs | Arrival times | Instantaneous RTT |
| --- | --- | --- |
| 0, 1 | $t^s_0(0), t^s_0(1)$ | $PT(0) = t^s_0(1) - t^s_0(0)$ |
| 2, 3 | $t^s_1(2), t^s_1(3)$ | $PT(1) = t^s_1(3) - t^s_1(2)$ |
| 3, 4 | $t^s_1(3), t^s_1(4)$ | $PT(2) = t^s_1(4) - t^s_1(3)$ |
| 4, 5 | $t^s_1(4), t^s_1(5)$ | $PT(3) = t^s_1(5) - t^s_1(4)$ |
| 6, 7 | $t^s_2(6), t^s_2(7)$ | $PT(4) = t^s_2(7) - t^s_2(6)$ |
| 7, 8 | $t^s_2(7), t^s_2(8)$ | $PT(5) = t^s_2(8) - t^s_2(7)$ |
| 8, 9 | $t^s_2(8), t^s_2(9)$ | $PT(6) = t^s_2(9) - t^s_2(8)$ |

Instantaneous PT values in an interest session are used to estimate a PT, as shown in Equation 7 below.

$$PT_e(t_k) = (1-\gamma)*PT_e(t_k-1) + \gamma*(t_k-t_{k-1}) \quad \text{Equation 7}$$

In Equation 7, $\gamma$ denotes a parameter that is experimentally decided for optimal performance.

The RTT estimation method is further described with reference to FIG. 4.

Based on the estimated RTT, values of various timers are calculated. Example timers to calculate include a retransmission timer, a delayed interest timer, and a NACK timer. An RTT estimation method in the present disclosure is performed based on accurate information from the timers. However, timer computation sometimes varies, and is not limited to only a predetermined timer value. In an example, hop count information provided in a content object is used to compute a more accurate timer values when the timer values vary.

Here, a definition used to compute a retransmission timer value is described.

In an example, when an interest with a range equal to a number of requests is sent, a retransmission timer is started. When predetermined content within the range is received, the retransmission timer is stopped. When no content in the range is received until the retransmission timer expires, an original interest is retransmitted. The retransmission timer operates in this manner so as to ensure that the information is transmitted.

The above definition of the retransmission timer is consistent with the definition of a retransmission timer of a TCP. Accordingly, a timeout value is computed as specified in a retransmission timer specification for the TCP, as shown in Equation 8 below.

$$RTO=RTT_e+\max(G,K*RTT\text{-}Var) \quad \text{Equation 8}$$

In Equation 8, $RTT_e$ indicates an RTT estimated at a time $t_k$, G indicates a heartbeat timer granularity, and RTT-Var indicates variance estimation at the time $t_k$. In an example, K has a value of "4."

In another example, a retransmission timer is calculated as defined below. When an interest with a predetermined range is sent, the retransmission timer is started. When all content in a window range is received, the retransmission timer is stopped. When predetermined content is received until the retransmission timer expires, or no content is received until the retransmission timer expires, an original interest or a modified interest is retransmitted.

Because the first node 101 needs to wait for all content to be received using this approach, a timer value is calculated as shown in Equation 9 below.

$$RTO=RTT_e+(W_c-1)*PT_e+\max(G,K*RTT\text{-}Var) \quad \text{Equation 9}$$

In Equation 9, $W_c$ indicates a window size of an interest that is to be sent.

In this example, variations in PT estimation are ignored for computation of a retransmission timeout (RTO), but in another example the various in PT estimation are included for more accurate computation of the RTO. For the above-described definitions, an RTO's back-off mechanism remains the same as that of a TCP.

Here, a delayed interest timer is described. For example, when an interest session starts, and when initial content is received, a timer is started to ascertain a point in time at which a next interest is to be sent.

A delayed interest timeout, hereinafter referred to as a "DTO," is computed based on a number of contents that remain in an interest session to be received, which may be denoted as $W_c-1$. The DTO may be calculated using Equation 10 below.

$$DTO=(W_c-1)*PT_e(t_k) \quad \text{Equation 10}$$

Equation 10 is valid under an assumption of minimum variation in a hop count for reception of content within the interest session.

Here, a NACK timer is defined. For example, when a predetermined missing content segment is found, content is expected to be missed because of content arrival being delayed by content objects traversing through different paths, apart from a dropping of all content objects.

When a missing chunk, or a missing segment is found, the NACK timer is started, to allow a system to wait for a predetermined period of time before sending another request for the missing segment. The predetermined period of time is referred to as a "NACK timeout," or "NTO." Using estimation of a PT according to various examples discussed, an NTO may be calculated as shown in Equation 11 below.

$$NTO=y*PT_e(t_k) \quad \text{Equation 11}$$

In Equation 11, y indicates a number of missing segments between two pieces of content which result in detection of holes.

Figure 4:
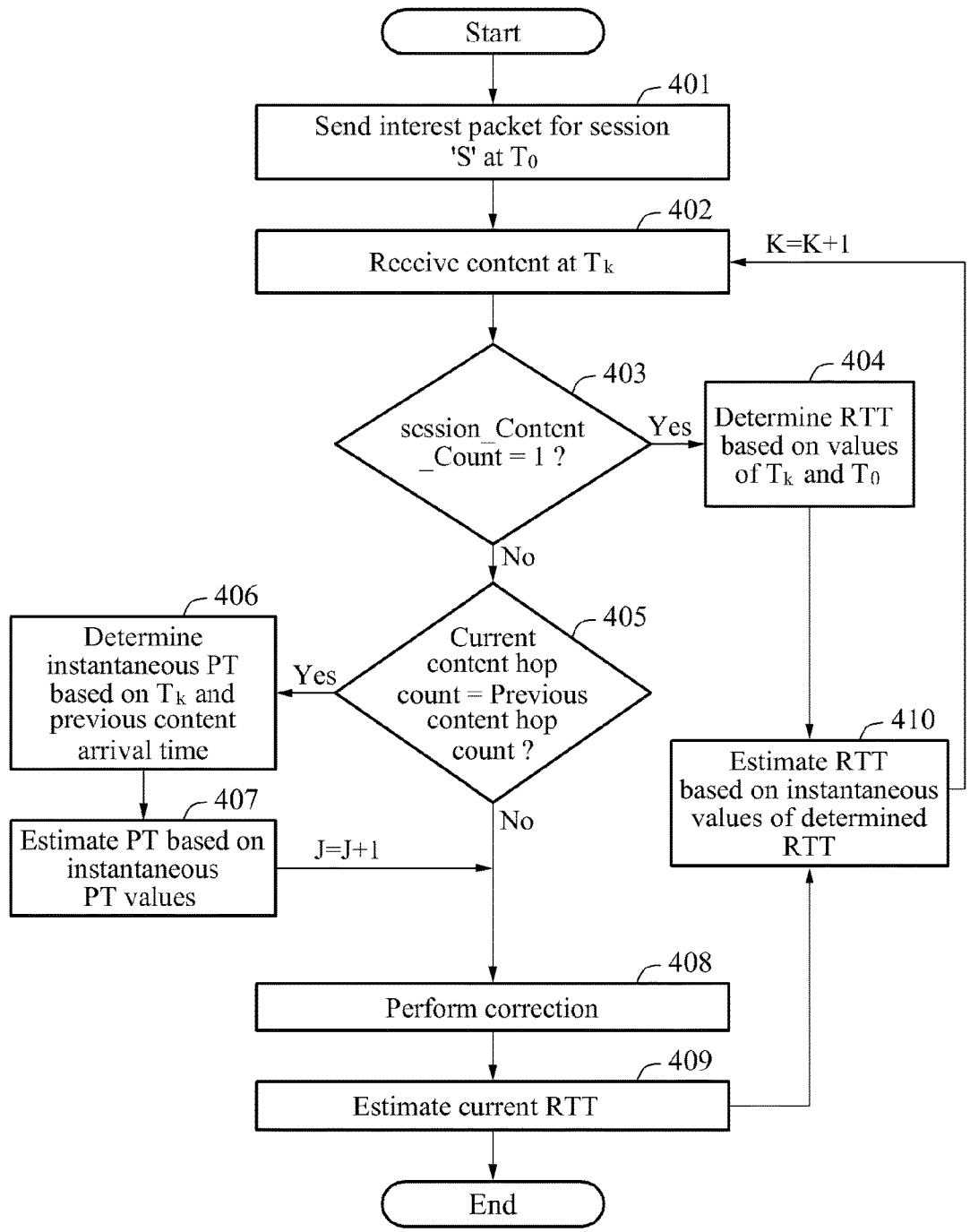
FIG. 4 is a flowchart illustrating an example of an RTT estimation method.

FIG. 4 illustrates an example of an RTT estimation method.

In the RTT estimation method of FIG. 4, at least one request in an interest packet is sent to at least one node. For example, in the example of FIG. 4, an interest packet with at least one request is sent to obtain content associated with the at least one request.

Referring to FIG. 4, in operation 401, the method sends an interest packet for a session 'S' at a time $T_0$ to obtain content. For example, the first node 101 of FIG. 1 sends an interest packet for a session 'S' at a time $T_0$ to obtain content.

For example, an application in the first node 101 sends the interest packet to a second node. In an example, the application is a web browser.

In operation 402, the method receives content associated with the at least one request from the second node. For example, the first node 101 receives content associated with the at least one request from the second node. In such an example, the content corresponds to the interest packet. For example, the first node 101 receives the content at a time $T_k$.

In operation 403, the method determines whether a content count in the session 'S' is equal to "1." For example, the first node 101 determines whether a content count in the session 'S' is equal to "1." The content count in the session 'S' refers to a number of content received at the first node 101, and is expressed, in an example, as session_Content_Count. In an example in which the content count is determined to be "1," the first node 101 determines an RTT based on values of the times $T_k$ and $T_0$ in operation 404. In this example, the RTT has a value of "$T_k-T_0$."

In another example in which the content count is determined to be values other than "1," the method determines whether a current content hop count is equal to a previous content hop count in operation 405. For example, the first node 101 determines whether a current content hop count is equal to a previous content hop count in operation 405. When the current content hop count is determined to be equal to the previous content hop count, in operation 406, the method determines an instantaneous PT based on the time $T_k$, that is, a session time, and a previous content arrival time. For example, the first node 101 determines an instantaneous PT based on the time $T_k$, that is, a session time, and a previous content arrival time. In such an example, when content is received from the same node, or the same hop, a PT of the received content is determined based on a previous content arrival time.

An instantaneous PT of current content is calculated as shown in Equation 12 below.

$$PT_{curr}=T_k-T_{prev\_content} \quad \text{Equation 12}$$

In Equation 12, $PT_{curr}$ indicates a current processing time, $T_k$ indicates a current content arrival time, and $T_{prev\_content}$ indicates a previous content arrival time.

In operation 407, the method uses instantaneous PT values are used to estimate a PT. When the current content hop count is determined to differ from the previous content hop count, in operation 408, the method performs correction based on the PT. For example, the correction indicates that content is received from different nodes. In such an example, the correction is performed based on "previous correction for a session+(same hop_PKtCount−1)×PT." When the RTT estimation method of FIG. 4 proceeds from operation 407 to operation 408, J may be incremented by "1." By incrementing J, the RTT estimation method moves onto the next piece of content.

In operation 409, the method estimates a current RTT, based on the correction performed in operation 408. For example, the current RTT may be estimated as shown in Equation 13 below.

$$RTT_{curr}=(T_k-T_0)\text{-Correction} \quad \text{Equation 13}$$

In operation 410, the method estimates a total RTT based on instantaneous values of the RTT determined in operation 404.

When the RTT estimation method loops back from operation 410 to operation 402, the content count K is incremented by "1." In examples, operations 401 through 410 are performed as shown in FIG. 4, in a different order, or simultaneously. Additionally, one or a portion of operations 401 through 410 are omitted in some examples or other operations are performed.

Figure 5:
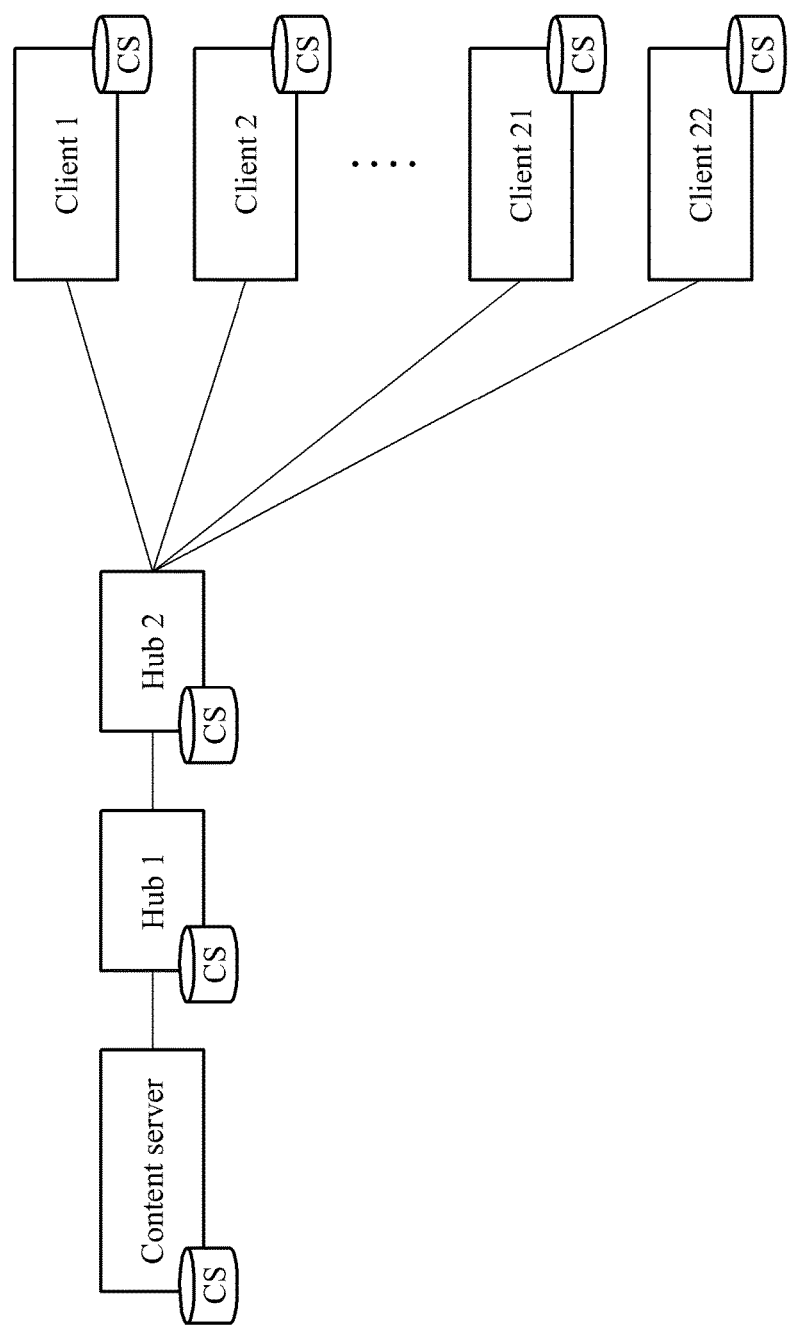
FIG. 5 is a diagram illustrating an example of a CCN with a plurality of CCN hubs in which nodes request a CCN server to send a file.

FIG. 5 illustrates an example of a CCN with CCN hubs in which nodes request a CCN server to send a file.

In the example architecture of FIG. 5, an RTT estimation method is compared to a method in which a previous interest time is used to compute various timer values. For example, a difference between a time difference between a sent interest and last received content, and a product of a multiplication factor and an RTT is used. In this example, the multiplication factor has a value of "1.2." The above comparison is performed using a simple method, however, it is potentially advantageous that an RTT estimation algorithm requires a constant multiplication factor that is required to be found experimentally. The RTT estimation method does not require another multiplication factor, potentially reducing the need for experimentation.

Referring to the example FIG. 5, clients 1 to 22 are connected to a content server through hubs 1 and 2.

Figure 6:
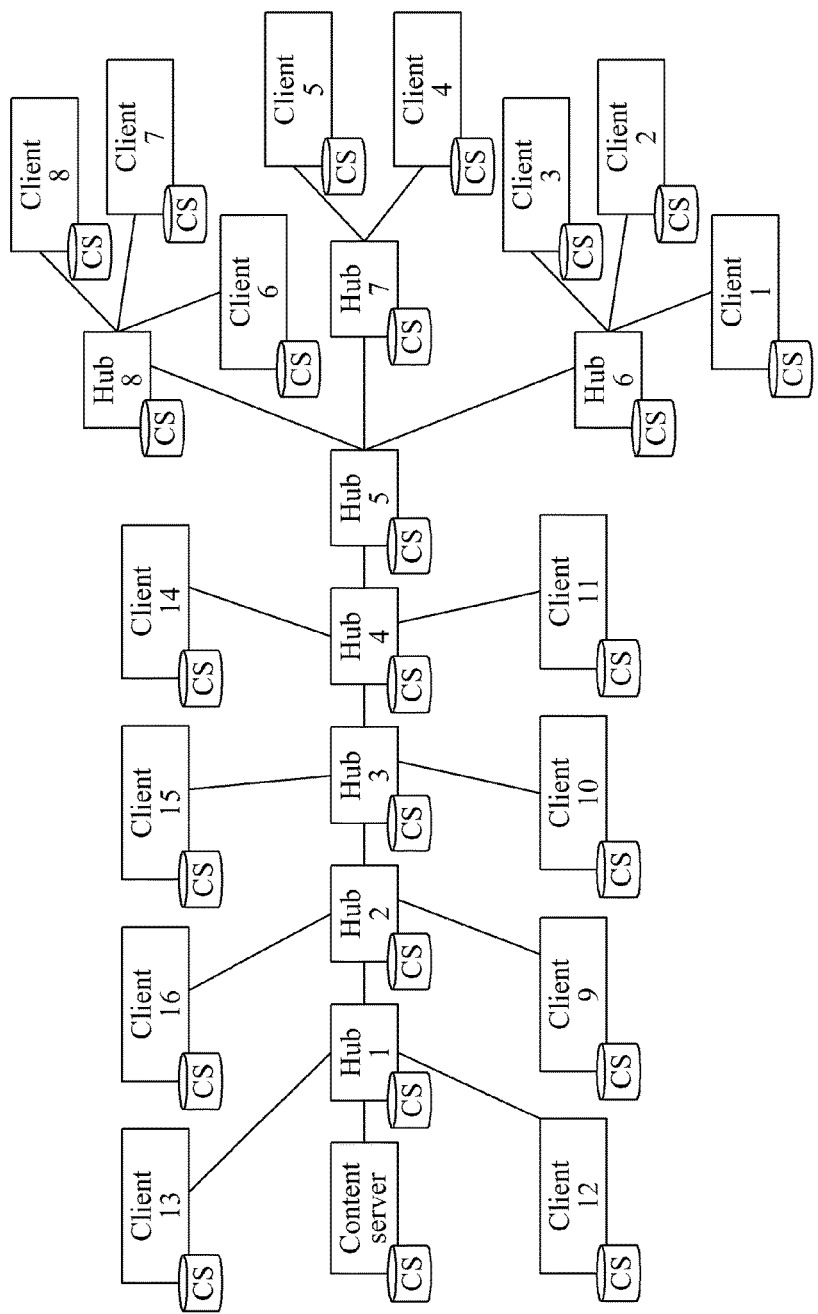
FIG. 6 is a diagram illustrating an example of a CCN with a plurality of CCN hubs in which nodes request a file.

FIG. 6 illustrates an example of a CCN with a plurality of CCN hubs in which nodes request a file.

In the example architecture of FIG. 6, an RTT estimation method is compared with a method in which a previous interest time is used to compute various timer values. For example, a difference between a time difference between a sent interest and last content received and a product of a multiplication factor and an RTT is used. In this example, the multiplication factor has a value of "1.2."

Referring to FIG. 6, clients 1 to 16 are connected to a content server through hubs 1 to 8. Additionally, the clients 1 to 16 are connected to each other through the hubs 1 to 8.

Figure 7A:
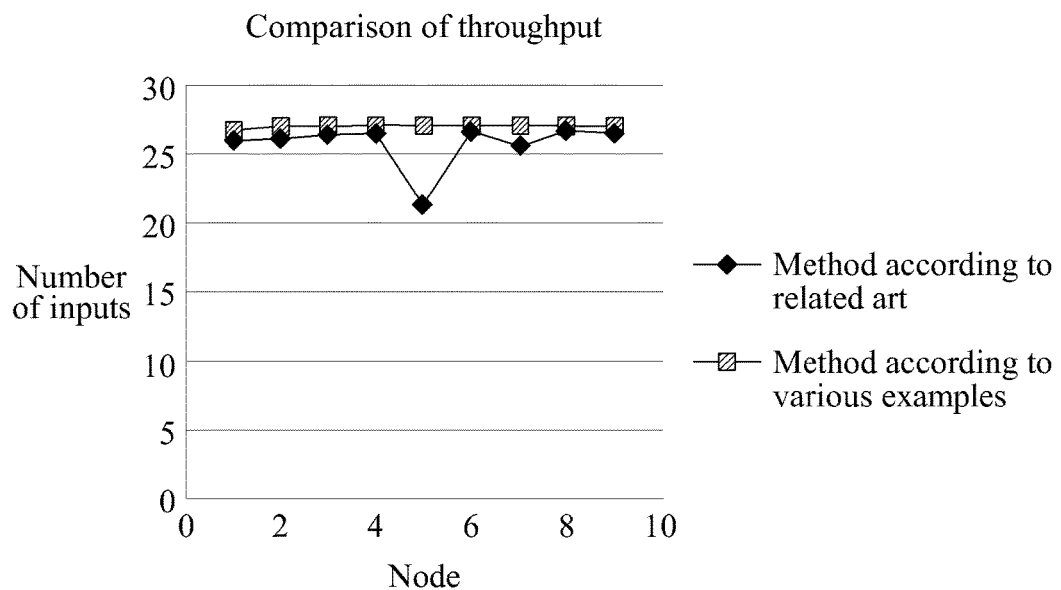
FIGS. 7A and 7B are graphs illustrating a comparison of a throughput and a comparison of a number of sent interests between an RTT estimation method according to various examples and an RTT estimation method according to related art.
Figure 7B:
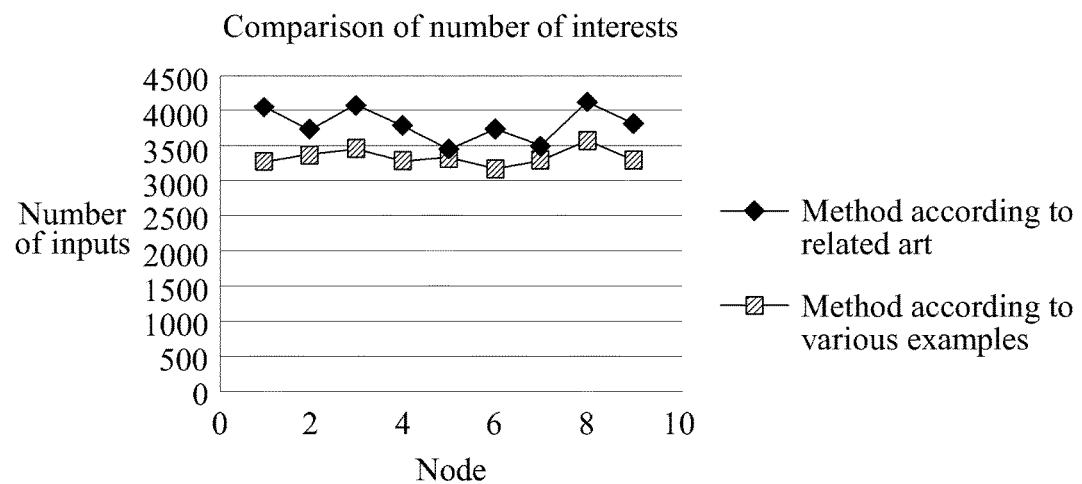

FIGS. 7A and 7B illustrate graphs for a comparison of a throughput and comparison of a number of sent interests between an RTT estimation method according to various examples and an RTT estimation method according to a related art. The comparisons are performed based on the example architecture of FIG. 5.

Figure 8:
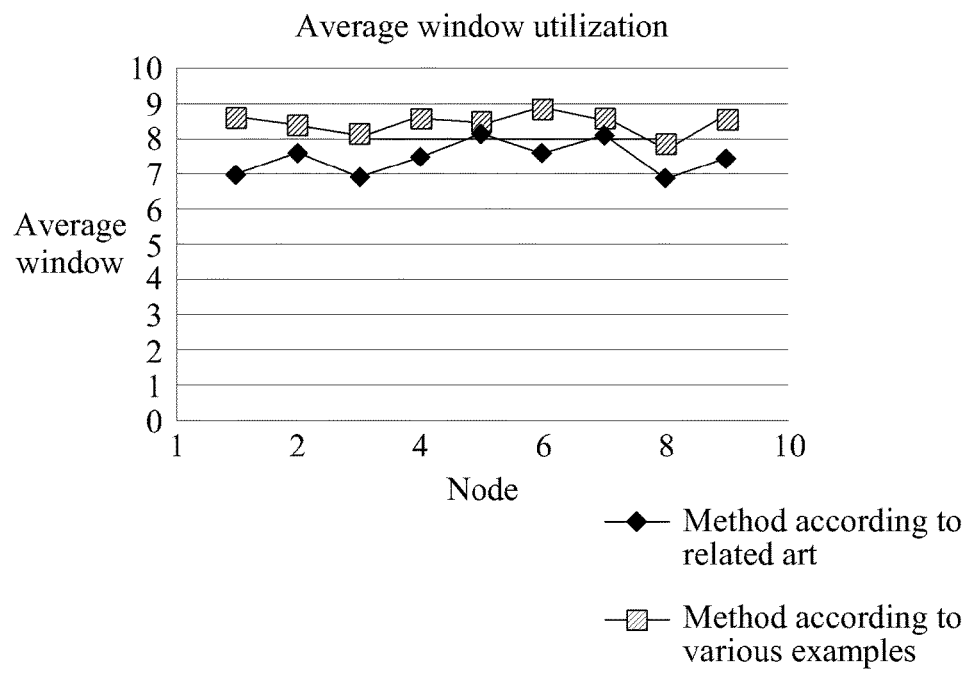
FIG. 8 is a graph illustrating average window utilization for the CCN of FIG. 5.

FIG. 8 illustrates an example of average window utilization for the CCN of FIG. 5. As illustrated in FIG. 8, an x-axis represents a CCN client node. As an average window size increases, network conditions are generally better predicted.

Figure 9A:
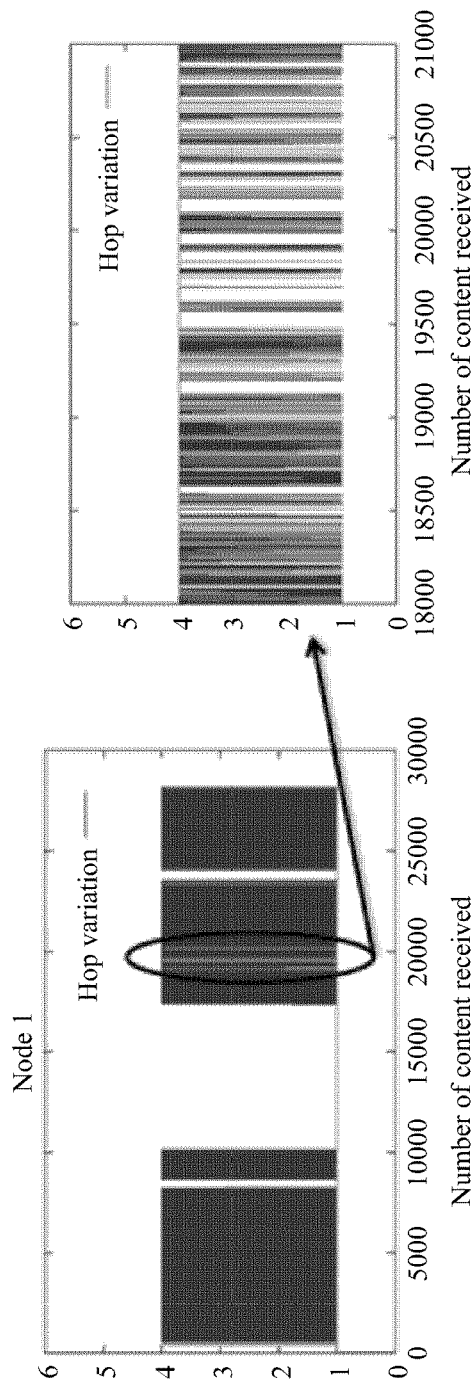
FIGS. 9A and 9B are graphs illustrating examples of variation in average window utilization of the CCN of FIG. 5.
Figure 9B:
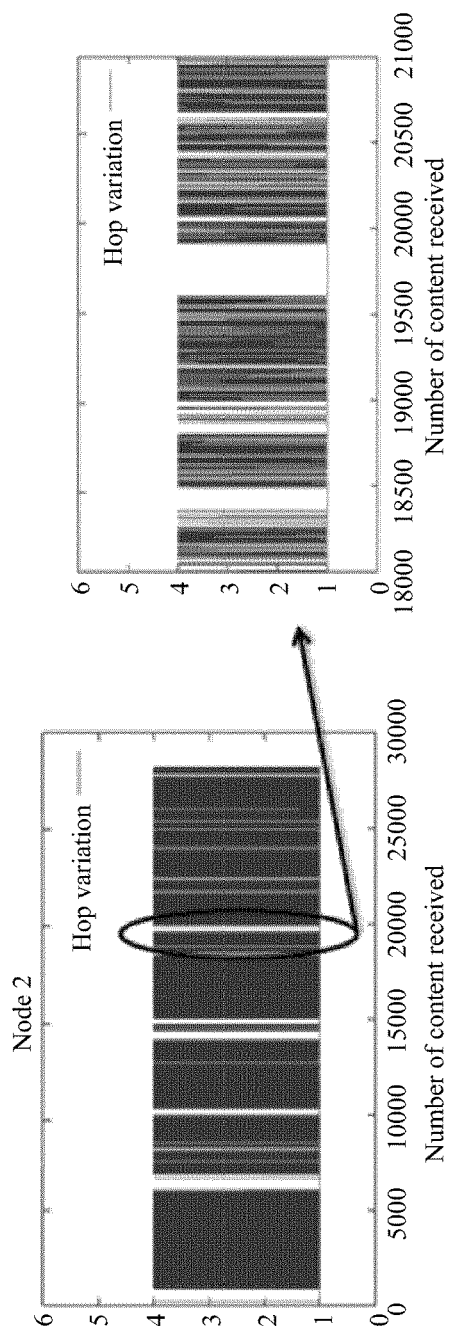

FIGS. 9A and 9B illustrate examples of variation in hop of the CCN of FIG. 5.

Figure 10:
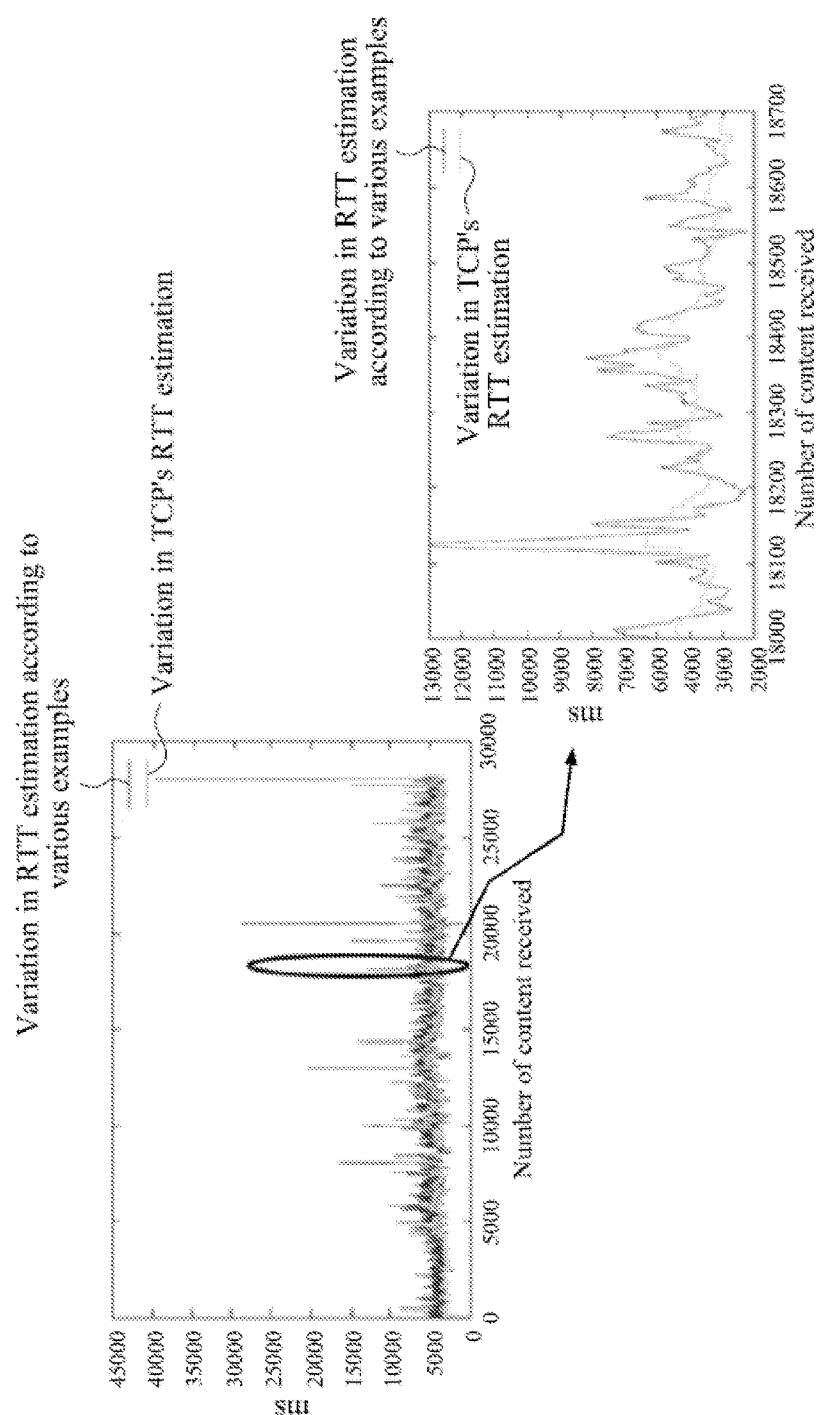
FIG. 10 illustrates graphs for comparisons of RTT estimation and TCP's RTT estimation when at least one request in an interest packet is sent, in the CCN of FIG. 5.

FIG. 10 illustrates an example of comparison of RTT estimation and TCP's RTT estimation when at least one request in an interest packet is sent, in the CCN of FIG. 5.

Figure 11:
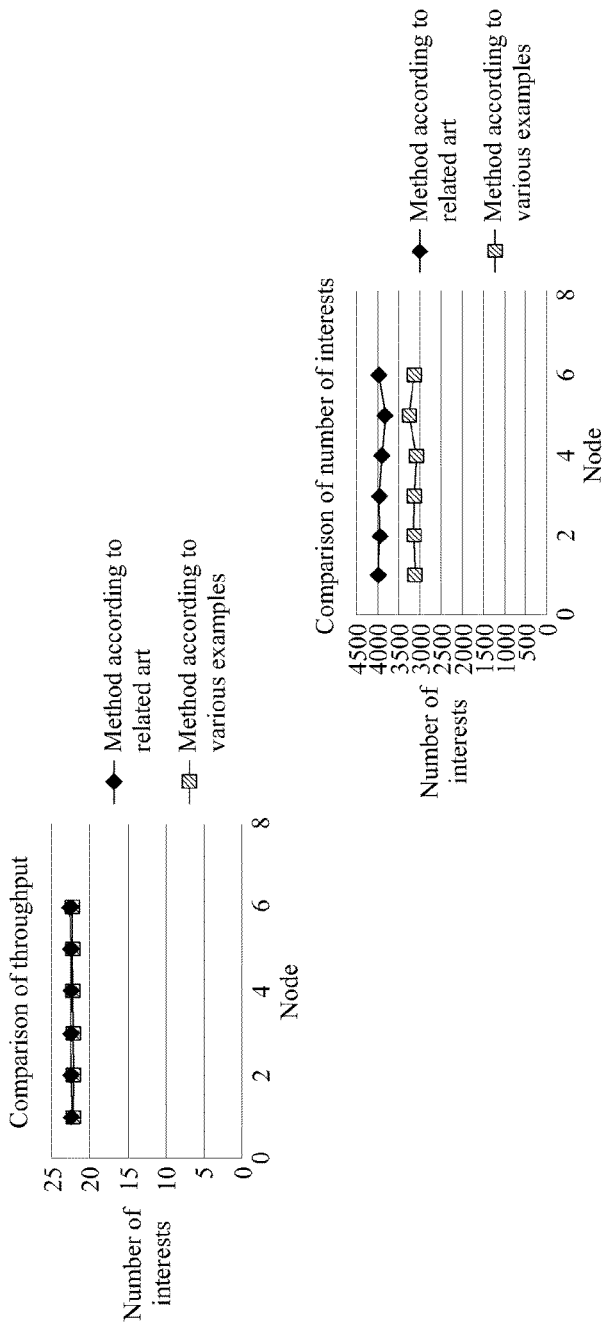
FIG. 11 illustrates graphs for an example of a number of interests sent for the same throughput, in the CCN of FIG. 6.

FIG. 11 illustrates an example of a number of interests sent for the same throughput, in the CCN of FIG. 6. FIG. 11 illustrates an example of an RTT estimation method, and a mechanism in which a previous session window worth information is used to calculate a value of a delayed interest timer. In FIG. 11, the throughput and the number of interests sent are compared between a basic RTT method and an RTT estimation method for an average interest window size, according to various examples.

Figure 12:
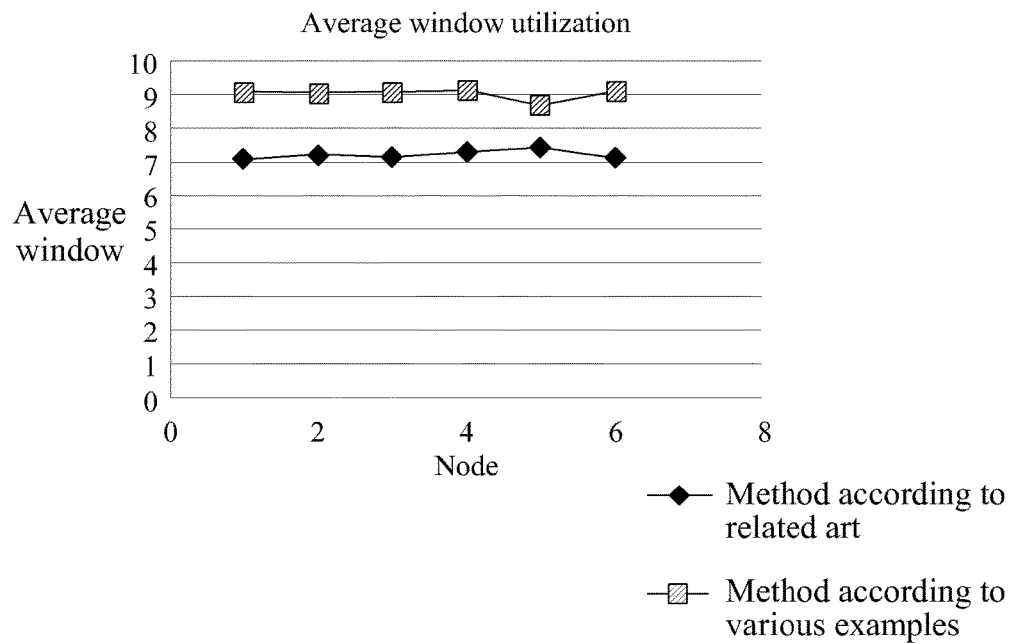
FIG. 12 is a graph illustrating an example of a comparison of average window utilization for the CCN of FIG. 6.

FIG. 12 illustrates an example of comparison of average window utilization for the CCN of FIG. 6.

As illustrated in FIG. 12, an x-axis represents CCN client nodes. As an average window size increases, network conditions are generally better predicted.

Figure 13:
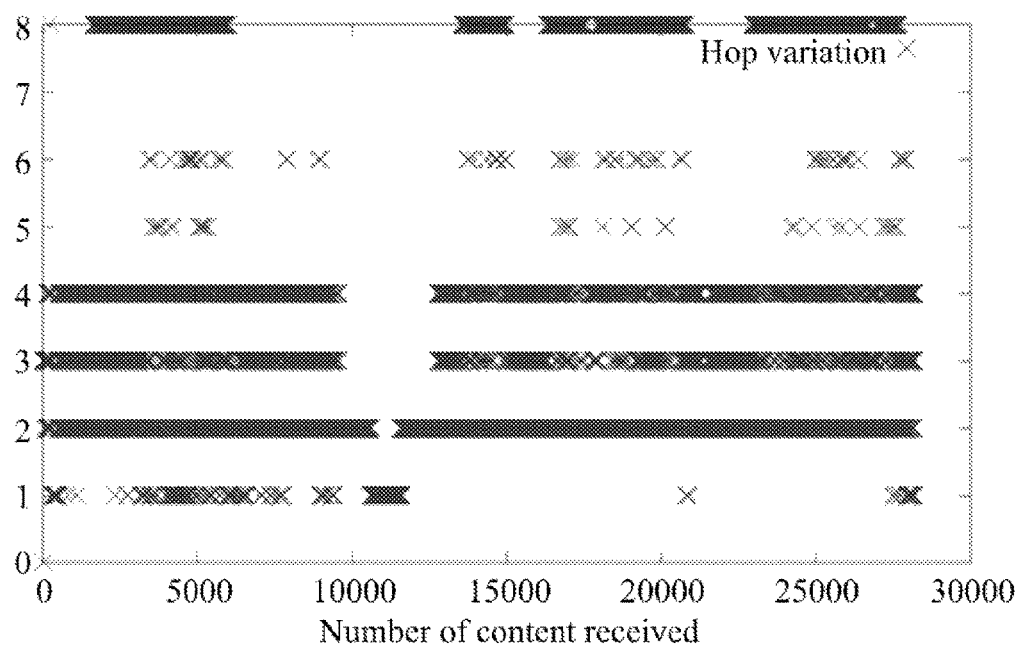
FIG. 13 is a graph illustrating an example of a variation in a content hop count in a node of the CCN of FIG. 6.

FIG. 13 illustrates an example of a variation in a content hop count in a node of the CCN of FIG. 6. FIG. 13 illustrates a content hop count distribution. The graph of FIG. 13 indicates that content is received from varying hops.

Figure 14:
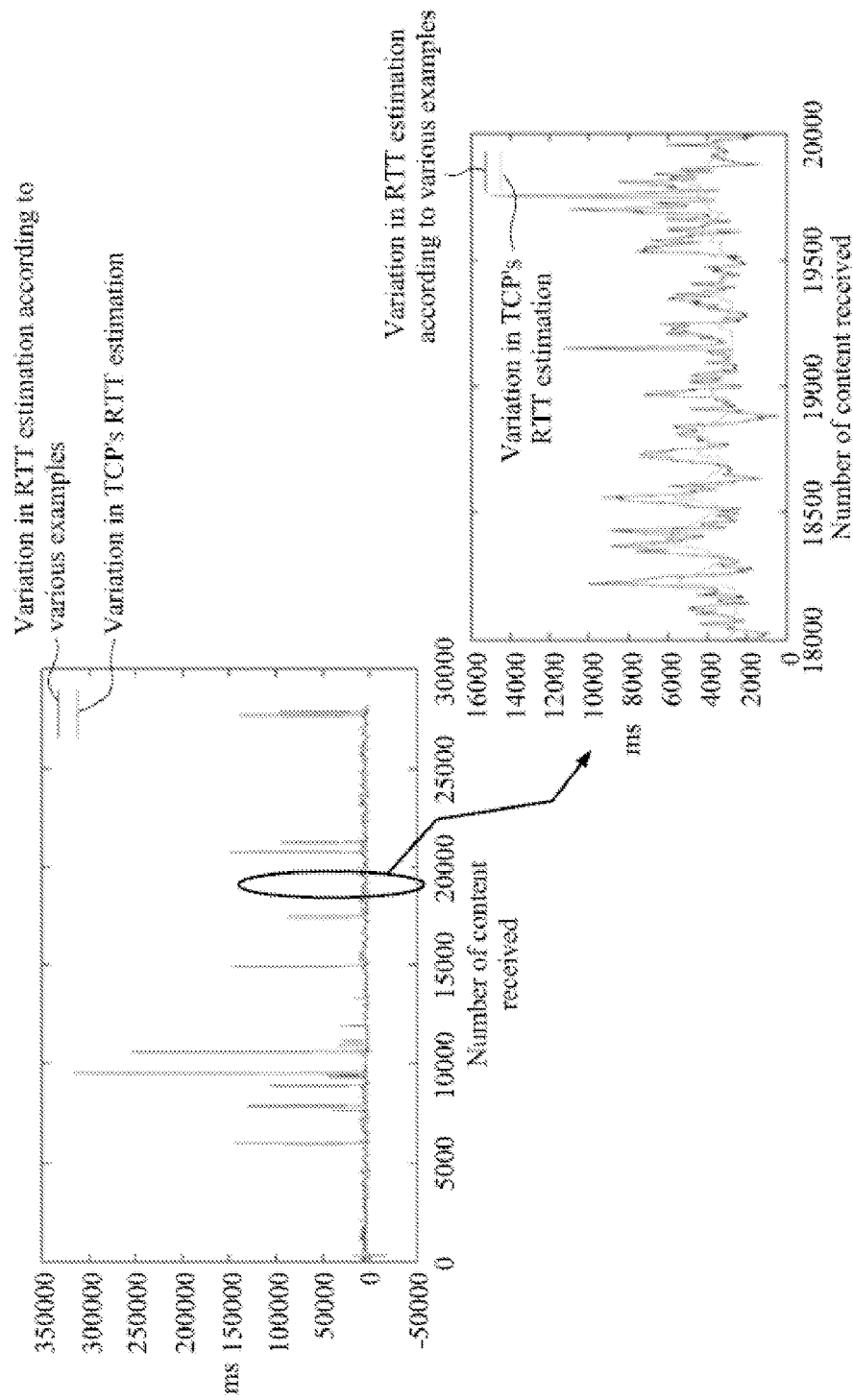
FIG. 14 illustrates graphs for a variation in RTT estimation according to various examples and a variation in TCP's RTT estimation in a predetermined node for the CCN of FIG. 6.

FIG. 14 illustrates examples of a variation in RTT estimation according to various examples and variation in TCP's RTT estimation, in a predetermined node for the CCN of FIG. 6. In the TCP's RTT estimation, the estimation in one example is performed for first content arrival only, and for all successive content in the interest session, the RTT estimation is constant.

FIG. 15 illustrates an example of comparison results between a proposed mechanism and an alternative mechanism for four PC setups. The four PC setups include, in the example of FIG. 15, a single CCN server, two CCN hubs, and a single CCN client.

In the alternative mechanism used in some examples, an RTT is estimated in a single interest session by using an interest send time and arrival times of content in the interest session, instead of using a hop count field in a content object.

When $T_i$ denotes an interest send time, and $T_0, T_1, \ldots, T_w$ denote content arrival times, an RTT is calculated as shown in Equation 14 below.

$$RTT_e(T_k) = (1-\alpha)*RTT_e(t_k-1) + \alpha*(T_r - T_i), \text{ for } r = 0, 1, \ldots, W_c \quad \text{Equation 14}$$

In Equation 14, $W_c$ indicates a current window size of an interest session, $T_r$ indicates a content arrival time of $r^{th}$ content, and $T_i$ indicates an interest send time.

Accordingly, a sawtooth RTT estimation is performed. In the sawtooth RTT estimation, an RTT estimate increases over an interest session, and decrease at a beginning of a next interest session before the RTT estimate again increases. Thus, the above RTT estimation includes cumulative RTT estimation. Various timer values are computed as factors of the estimated RTT. Thus, a DTO and an NTO are calculated as shown in Equations 15 and 16, respectively, below.

$$DTO = x*RTT_e(t_k) \quad \text{Equation 15}$$

In Equation 15, x is experimentally determined.

$$NTO = y*RTT_e(t_k) \quad \text{Equation 16}$$

In Equation 16, y is experimentally determined.

In the example of FIG. 15, four PC setups including a CCN server, two CCN hubs and a CCN client are used. An optimum DTO factor is determined to be approximately "0.5," and an NTO factor may be "0.1." For the same throughput, a number of interests received in an RTT mechanism according to various examples is less than that of the alternative mechanism.

FIG. 16 illustrates an example of results between a proposed mechanism and an alternative mechanism for two mobile setups. The two mobile setups include, in the example of FIG. 16, a single CCN server, and a single CCN client.

In a mobile scenario, a number of interests in the proposed mechanism, that is, an RTT mechanism are potentially less than that of the alternative method. Additionally, the alternative mechanism requires different DTO factors for different environments. In an example, the alternative mechanism requires a DTO factor of 0.5 for a personal computer (PC) environment, and requires a DTO factor of 0.2 for a mobile environment. The RTT mechanism automatically adjusts a DTO factor based on an environment.

Figure 17:
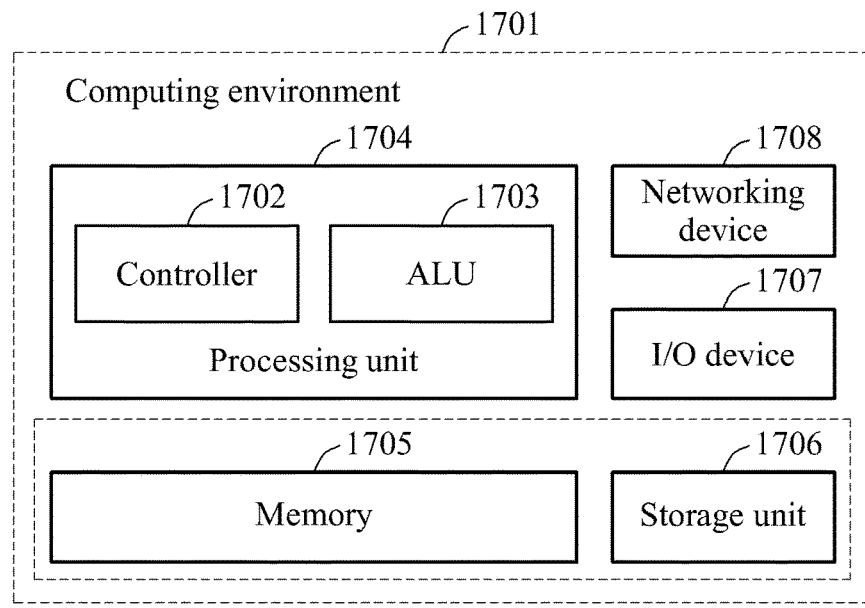
FIG. 17 is a block diagram illustrating an example of a computing environment to implement a method and system for estimating an RTT when an interest packet with at least one request is sent to obtain content from a CCN.

FIG. 17 illustrates an example of a computing environment to implement a method and system for estimating an RTT when an interest packet with at least one request is sent to obtain content from a CCN.

As illustrated in FIG. 17, a computing environment 1701 includes at least one processing unit 1704, a memory 1705, a storage unit 1706, at least one networking device 1708, and at least one input/output (I/O) device 1707. The processing unit 1704 includes a controller 1702, and an arithmetic logic unit (ALU) 1703. The processing unit 1704 may process instructions of an algorithm. The processing unit 1704 receives a command to perform processing from the controller 1702. Additionally, predetermined logical and arithmetic operations associated with execution of instructions may be computed with help of the ALU 1703.

The overall computing environment 1701 optionally includes a plurality of homogeneous and/or heterogeneous cores, different types of central processing units (CPUs), special media, and accelerators. The processing unit 1704 processes instructions included in the algorithm. In examples, a plurality of processing units 1704 are located on a single chip, or over multiple chips.

An algorithm including instructions and codes required for the implementation is stored in either the memory 1705 the storage unit 1706, or both. During execution, the instructions are fetched from the memory 1705 and/or the storage unit 1706, and are executed by the processing unit 1704.

In an example of implementation of predetermined hardware, various networking devices, or external I/O devices are connected to the computing environment 1701, to support the implementation through a networking unit and an I/O unit.

Various examples are implemented through at least one software program running on at least one hardware device, or by performing network management functions to control hardware elements appropriately elements. The elements shown in FIGS. 1, 2, 5, 6 and 17 may include blocks that may be at least one hardware device, or a combination of a hardware device and a software module.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

A terminal, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a thin client. A personal computer can run software that emulates the function of a terminal, sometimes allowing concurrent use of local programs and access to a distant terminal host system.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of estimating a round trip time (RTT) in a first node, the method comprising:
   generating an interest packet comprising content requests and identifiers; sending the interest packet to at least one second node;
   receiving, at the first node, in response to one of the content requests, content with an identifier to identify a second node, among the at least one second node, that sends the content to the first node;
   determining an instantaneous processing time (PT) based on a session time and a previous content arrival time, in response to a current hop count for the content to reach the first node in the identifier being determined to be equal to a previous hop count for a previous content to reach the first node;
   determining a processing time (PT) in which the interest packet is processed in the second node, based on an arrival time at which the content is received by the first node and the instantaneous PT; evaluating an instantaneous round trip time (RTT) for the content received by the first node, based on the arrival time at which the content with the identifier is received at the first node, a sending time at which the interest packet is sent to the second node, or the determined PT;
   estimating the RTT for the interest packet based on the evaluated instantaneous RTT;
   determining a delayed interest timer based on the determined PT and the estimated RTT;
   and sending a next interest at a time based on the determined delayed interest timer.

2. The method of claim 1, wherein the evaluating is further based on either one or both of the sending time at which the interest packet is sent to the second node and the determined PT.

3. The method of claim 1, further comprising: identifying content, which is associated with a first request among the content requests, in a content store (CS) prior to sending the interest packet, which further comprises a parameter, to the second node.

4. The method of claim 3, wherein the parameter comprises a number of requests or a request start segment number.

5. The method of claim 3, wherein the parameter in the interest packet is altered, based on availability of the content at the content store, before the interest packet is sent to the second node.

6. The method of claim 1, wherein the PT is determined based on an arrival time at which the content with the identifier is received at the first node.

7. The method of claim 1, further comprising:
   determining a retransmission timer or a negative acknowledgement (NACK) timer, based on the estimated RTT.

8. The method of claim 7, wherein
   the delayed interest timer represents a time interval after the interest packet is sent to the second node,
   the NACK timer is determined based on the determined PT, and
   a value of the NACK timer indicates a waiting time for sending a request to receive missing content at the first node.

9. A method of controlling a first node to communicate with a second node, the method comprising:
   sending an interest packet comprising requests to the second node;
   receiving content corresponding to one of the requests from the second node; determining an instantaneous processing time (PT) based on a session time and a previous content arrival time, in response to a current hop count for the content to reach the first node in an identifier of the content being determined to be equal to a previous hop count for a previous content to reach the first node;
   determining a processing time (PT) in which the second node processes the interest packet, based on an arrival time of the received content and the instantaneous PT;
   estimating a round-trip time (RTT) based on a sending time of the interest packet, the arrival time, or the determined PT; determining a delayed interest timer based on the determined PT and the estimated RTT; and sending a next interest at a time based on the determined delayed interest timer.

10. The method of claim 9, wherein the estimating is based on any combination of any two or more of the sending time of the interest packet, the arrival time, and the determined PT.

11. The method of claim 9, the further comprising:
    prior to sending the interest packet to the second node, identifying content, associated with a first request among the requests, in a content store (CS).

12. The method of claim 11, wherein the interest packet further comprises a parameter, and the parameter comprises a number of the request or a request start segment number.

13. The method of claim 12, wherein the parameter is altered based on availability of the content at the content store.

14. The method of claim 13, wherein the interest packet with the altered parameter is sent to the second node.

15. The method of claim 9, further comprising: determining a retransmission timer or a negative acknowledgement (NACK) timer, based on the estimated RTT.

16. The method of claim 15, wherein the delayed interest timer represents a time interval after the interest packet is sent to the second node, the NACK timer is evaluated based on the determined PT, and a value of the NACK timer indicates a waiting time for sending a request to receive missing content at the first node.

17. The method of claim 9, wherein the estimating comprises evaluating an instantaneous RTT based on the sending time, the arrival time, or the determined PT, and
estimating the RTT based on the instantaneous RTT.

18. The method of claim 17, wherein the estimating of the RTT based on the instantaneous RTT comprises estimating the RTT using the instantaneous RTT and a transmission control protocol (TCP)-like RTT estimation method.

19. The method of claim 17, wherein pieces of content are received, and
the evaluating comprises evaluating an instantaneous RTT for each of the pieces of content based on any one or any combination of any two or more of an arrival time of each of the plurality of pieces of content, the sending time, and the determined PT.

20. A method of estimating a round trip time (RTT) in a first node, the method comprising: sending an interest packet comprising requests for content to second nodes; determining an instantaneous processing time (PT) based on a session time and a previous content arrival time, in response to a current hop count for a first content of the requested content to reach the first node in an identifier of the first content being determined to be equal to a previous hop count for a previous content to reach the first node;
determining a processing time (PT) in which the interest packet is processed in a second node, among the second nodes, that sends the first content, based on an arrival time at which the first content is received by the first node and the instantaneous PT;
estimating the RTT for the interest packet based on an evaluated instantaneous round trip time (RTT) for the interest packet received by the first node, wherein the evaluated instantaneous RTT is based on the arrival time at which the first content is received by the first node, a sending time at which the interest packet is sent to the second node, or the determined PT; determining a delayed interest timer based on the determined PT and the estimated RTT; and sending a next interest at a time based on the determined delayed interest timer.

21. The method of claim 20, wherein the evaluating is further based on either one or both of the sending time at which the interest packet is sent to the second node and the determined PT.

22. The method of claim 20, further comprising: identifying content, which is associated with a first request among the requests, in a content store (CS), prior to sending the interest packet, which further comprises a parameter, to the second node.

23. The method of claim 22, wherein the parameter comprises a number of requests or a request start segment number.

24. The method of claim 22, wherein the parameter is altered before being sent to the second node based on availability of the content at the content store, and the interest packet with the altered parameter is sent to the second node.

25. The method of claim 20, further comprising: evaluating a retransmission timer or a negative acknowledgement (NACK) timer, based on the estimated RTT.

26. The method of claim 1, further comprising determining which node, among the at least one second node, sends the content by interpreting a value of a hop count field, which incrementally increases each time an intermediate node forwards the content.

27. The method of claim 1, further comprising determining the PT based on a the previous content arrival time, in response to the content being received from a same node, among the at least one second node, or a same hop.

* * * * *